United States Patent
Kirchmeyer et al.

(10) Patent No.: US 6,284,834 B1
(45) Date of Patent: Sep. 4, 2001

(54) AQUEOUS PREPARATION TREATMENT OF MINERAL BUILDING MATERIALS

(75) Inventors: Stephan Kirchmeyer, Leverkusen; Markus Mechtel, Köln; Karl-Heinz Käsler, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/317,248

(22) Filed: May 24, 1999

(30) Foreign Application Priority Data

May 29, 1998 (DE) ............................... 198 24 188

(51) Int. Cl.⁷ ...................................... C08L 83/06
(52) U.S. Cl. ..................... 524/588; 524/837; 427/387
(58) Field of Search ................... 524/588, 837; 427/387

(56) References Cited

U.S. PATENT DOCUMENTS

| | | | |
|---|---|---|---|
| 3,360,491 | * 12/1967 | Axon | 524/837 |
| 5,091,002 | * 2/1992 | Schamberg et al. | 106/2 |
| 5,360,851 | * 11/1994 | Feder et al. | 524/157 |
| 5,378,790 | 1/1995 | Michalczyk et al. | 528/35 |
| 5,621,038 | 4/1997 | Chen et al. | 524/547 |
| 5,686,523 | 11/1997 | Chen et al. | 524/547 |
| 5,719,251 | * 2/1998 | Wilczek et al. | 528/35 |
| 5,827,922 | 10/1998 | Chen et al. | 524/837 |
| 5,861,458 | * 1/1999 | Naganawa et al. | 524/837 |
| 5,880,305 | * 3/1999 | Kraus et al. | 556/459 |
| 6,005,131 | * 12/1999 | Jentsch et al. | 556/434 |
| 6,136,939 | 10/2000 | Mager et al. | 528/33 |

FOREIGN PATENT DOCUMENTS

| | | |
|---|---|---|
| 1339227 | 8/1997 | (CA) . |
| 744443 | 11/1996 | (EP) . |
| 96/35652 | 11/1996 | (WO) . |
| 98/38251 | 9/1998 | (WO) . |

* cited by examiner

Primary Examiner—Margaret G. Moore
(74) Attorney, Agent, or Firm—Joseph C. Gil; Richard E. L. Henderson; Thomas W. Roy

(57) ABSTRACT

The present invention relates to novel aqueous preparations for the treatment of mineral building materials containing (I) an aqueous emulsion of at least one polyfunctional carbosilane and/or carbosiloxane (A) and/or the (partial) condensation product thereof, (II) an emulsion of at least one organo(poly)siloxane (B), (III) at least one organic polymer (C) dispersible or emulsified in water, (IV) inorganic nanoparticles (D) dispersed or dispersible in water, and (V) optionally other additives (E).

17 Claims, No Drawings

AQUEOUS PREPARATION TREATMENT OF MINERAL BUILDING MATERIALS

BACKGROUND OF THE INVENTION

The present invention relates to novel aqueous preparations for the treatment of mineral building materials comprising (I) an aqueous emulsion of at least one polyfunctional carbosilane and/or carbosiloxane (A) and/or the (partial) condensation product thereof, (II) an emulsion of at least one organo(poly)siloxane (B), (III) at least one organic polymer (C) dispersible or emulsified in water, (IV) inorganic nanoparticles (D) dispersed or dispersible in water, and (V) optionally other additives (E).

The construction and building materials industry is searching for aqueous treatment agents for mineral building materials that impregnate or waterproof the materials well, that increase resistance to chemicals in order to protect against environmental influences, and that at the same time impart good easy to clean properties to the building material. In so doing, the appearance of the mineral building material must not be changed, for example, in order to protect monuments, natural stone facades, or terracotta materials from environmental influences or from graffiti.

Aqueous emulsions of organosilicon compounds have been successful as impregnating, waterproofing, and building protective agents for mineral building materials.

DE-A 19,517,346 describes, for example, aqueous emulsions of organosilicon compounds for waterproofing porous mineral building materials and building coatings. On mineral building materials, aqueous emulsions of organosilicon compounds produce only inadequate easy to clean properties.

DE-A 3,702,542 describes graft copolymers of (meth) acrylic acid derivatives and alkoxy-functional silicone resins for impregnation purposes, especially in buildings protection. Although those graft copolymers are good impregnating agents and, especially as a pigmented formulation, impart good easy to clean properties to mineral building materials, they contain organic solvents and change the visual appearance of the substrate.

WO 97/12,940 discloses aqueous preparations which comprise an emulsion of an alkoxysilane that is insoluble or only slightly soluble in water and a polymer containing alkoxysilane groups that is dispersible or emulsified in water.

In addition, coating compositions based on multifunctional carbosilanes are known, see U.S. Pat. Nos. 5,378,790, 5,621,038 and 5,686,523. The preparation of such hybrid materials is mostly carried out in dilute organic solution, generally by means of a sol/gel process, which is disadvantageous for many applications because, for example, with the known hybrid materials, a high molecular weight network is built up in a sol/gel process. Those high molecular weight polymers are not able to permeate the mineral building material very well and consequently result in a change in the surface of the mineral building material, which mostly becomes shiny. Moreover, relatively large amounts of solvent are necessary in sol/gel processes. That is undesirable because of the toxicological properties and the fire risk of the solvents, and existing VOC guidelines.

Accordingly, the object of the present invention was to provide an aqueous preparation that effectively impregnates or waterproofs mineral building materials, that imparts to the mineral building material adequate chemical resistance and good easy to clean properties, and that at the same time does not change the outward appearance of the mineral building material.

Surprisingly, it has now been found that that object is achieved by aqueous preparations that comprise an emulsion of at least one polyfunctional carbosilane and/or carbosiloxane (A), an emulsion of at least one organo(poly)siloxane (B), at least one organic polymer dispersed or emulsified in water (C), inorganic nanoparticles dispersed or dispersible in water (D), and optional other additives (E).

SUMMARY OF THE INVENTION

The present invention, therefore, relates to aqueous preparations comprising
(I) an emulsion of a polyfunctional carbosilane and/or carbosiloxane (A),
(II) an emulsion of at least one organo(poly)siloxane (B),
(III) at least one organic polymer (C) dispersed or emulsified in water,
(IV) inorganic nanoparticles (D) dispersed or dispersible in water, and
(V) optional other additives (E).

DETAILED DESCRIPTION OF THE INVENTION

The polyfunctional carbosilanes and/or carbosiloxanes (A) are preferably silanes or siloxanes that contain at least two units of the formula (1)

$$—(CH_2)_m SiR^1_n X_{3-n} \quad (1)$$

wherein
m is from 1 to 6 (preferably 2 or 3),
n is from 0 to 2,
$R^1$ is an unsubstituted $C_1$–$C_{18}$-hydrocarbon (preferably methyl or ethyl) or a hydrocarbon that contains at least O, N, S, and/or P, each $R^1$ within the molecule being identical or different, and
X is a radical selected from the group OH, $C_1$–$C_4$ alkoxy, $C_6$–$C_{20}$ aryloxy, $C_1$–$C_6$ acyloxy, and hydrogen (preferably OH or $C_2$ alkoxy).

These compounds can be prepared, for example, by reacting silanes or siloxanes having Si—H bonds with appropriately functionalized silanes having vinyl, allyl, or higher alkenyl groups, or by reacting silanes or siloxanes having vinyl, allyl, or higher alkenyl groups with appropriately functionalized silanes having Si—H bonds.

In a further embodiment of the invention, the polyfunctional carbosilanes and/or carbosiloxanes (A) are silanes of the formula (2)

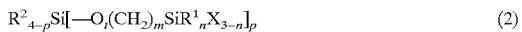

$$R^2_{4-p}Si[—O_t(CH_2)_m SiR^1_n X_{3-n}]_p \quad (2)$$

or the partial condensation products thereof,
wherein
t is 0 or 1,
p is 4, 3, or 2,
$R^2$ is $C_1$–$C_{18}$ alkyl and/or $C_6$–$C_{20}$ aryl, and
m, n, $R^1$, and X are as defined above.

In a further embodiment of the invention, the polyfunctional carbosiloxane (A) is a siloxane that is composed of at least two structural units selected from monofunctional units $R^3_3SiO_{1/2}$, difunctional units $R^4_2SiO_{2/2}$, and trifunctional units $R^5SiO_{3/2}$ and optionally, in addition, tetrafunctional units $SiO_{4/2}$ and/or the condensation product and/or partial condensation product thereof, wherein $R^3$, $R^4$ and $R^5$ are each independently of the others H, $C_1$–$C_{18}$ alkyl, $C_2$–$C_{18}$ alkenyl and/or $C_6$–$C_{20}$ aryl or units of the general formula (1).

Suitable siloxanes are, for example, siloxanes containing Si—H groups or vinyl, allyl, or higher alkenyl groups, which are prepared according to known processes, such as, for example, by hydrolysis and condensation of the corresponding chlorosilanes and, optionally, subsequent equilibration.

The underlying siloxanes preferably have a molecular weight (number average) of from 300 to 5000.

In a further preferred embodiment of the invention, the polyfunctional carbosiloxane (A) is a compound of formula (3)

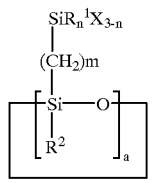

(3)

or the partial condensation product thereof, wherein a is from 3 to 6 (preferably 4) and $R^1$, $R^2$, X, m, and n are as defined above.

The polyfunctional carbosilanes (A) are very especially preferably the compounds of formula (4) and/or (5)

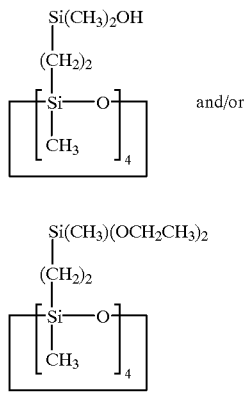

or the partial condensation products thereof.

Compounds of formulas (3), (4), and (5) can be prepared, for example, according to the process described in DE-A 19,603,241 or in DE-A 19,711,650.

Within the context of the invention, condensation products and partial condensation products are to be understood as being compounds which, for example, are formed wholly or partially by the reaction of two radicals of the general formula (1) with the removal of water or alcohol.

The emulsion is preferably aqueous or water in admixture with pure alcohol and preferably contains from 5 to 70 wt. % (especially from 10 to 50 wt. %) of the poly-functional carbosilane and/or siloxane.

The organo(poly)siloxane (B) is preferably at least one hydroxy- and/or alkoxy-functional organo(poly)siloxane that forms an emulsion with water, emulsifiers, that is to say, for example, anionic, cationic, and non-ionic emulsifiers, such as, for example, polyoxyethylene triglyceride, ethoxylated tridecyl alcohol, and, optionally, other auxiliary substances, such as, for example, protective colloids, anti-aging agents, bactericides, fungicides, and the like. The hydroxy- and/or alkoxy-functional organopolysiloxane preferably contains from 0 to 50 wt. % monofunctional units $R^6{}_3SiO_{1/2}$, from 0 to 60 wt. % difunctional units $R^7{}_2SiO_{2/2}$, from 0 to 100 wt. % trifunctional units $R^8SiO_{3/2}$ and from 0 to 60 wt. % tetrafunctional units $SiO_{4/2}$, the sum of all units being 100 wt. %, where $R^6$, $R^7$, and $R^8$ represent unsubstituted $C_1$–$C_{18}$ hydrocarbons or hydrocarbons that contain at least O, N, S, and/or P, and $R^6$, R7, and $R^8$ within the molecule may be identical or different from one another.

In the emulsion, the proportion of organo(poly)siloxane is preferably from 5 to 70 wt. % (especially from 10 to 50 wt. %), the proportion of emulsifier is from 0.1 to 30 wt. %, and the proportion of auxiliary substances is from 0 to 20 wt. %.

Within the context of the invention, organic polymers (C) dispersed or emulsified in water can be polymers that are reactive or unreactive towards the constituents (A) and (B).

Reactive organic polymers within the context of the invention contain groups which enter into stable covalent bonds with the inorganic constituents (A) and (B). Organic polymers containing corresponding reactive groups can be prepared by (co)polymerisation, as described, for example, in WO 97/12,940, or by functionalization of an unreactive organic polymer. Especially suitable for that purpose are substances that have a high degree of reactivity towards the organic polymer and at the same time also react readily with the inorganic constituents (A) and (B) of the composition according to the invention. Examples of such substances are functionalized alkoxysilanes.

Examples of organic polymers are polyimides, polycarbonates, polyesters, polyethers, polyamides, polyureas, polyurethanes, polyacrylonitriles, polyacrylamides, poly(meth)acrylic esters, polyvinyl esters, polyvinyl ethers, and polyolefins, as well as copolymers and mixtures thereof.

The organic polymers (C) dispersed or emulsified in water within the context of the invention are preferably aqueous acrylate dispersions that are hydroxy-functional and/or contain alkoxysilyl groups. A suitable hydroxy-functional acrylate dispersion is obtainable, for example, from Bayer AG under the name VPLS 2054. Other preferred organic polymers (C) dispersed or emulsified in water are polymers containing urea or urethane groups and having hydroxy and/or alkoxysilyl groups. A suitable hydroxy-functional polymer dispersion containing urethane groups is obtainable from Bayer AG under the name VPLS 2239.

Inorganic nanoparticles (D) within the context of the invention are, for example, metal or semimetal oxides or oxide hydrates having a particle diameter of from 5 to 100 nm (preferably from 5 to 50 nm), as determined by transmission electron microscopy. Examples of nanoparticles according to the invention are silica sols ($SiO_2$), boehmite sols (Al(O)OH), and/or $TiO_2$ sols. The inorganic nanoparticles can also be surface-modified in accordance with known processes, for example, by reaction with hexamethyldisilazane. In the preparation according to the invention, preferably used silica sols have an average particle size of from 5 to 100 nm (number average), especially silica sols having a particle size of from 5 to 50 nm. The particle size can be determined, for example, by electron microscopy.

Component (D) preferably corresponds to an aqueous dispersion of $SiO_2$ having an average particle size of from 5 to 100 nm (preferably from 5 to 50 nm) and an $SiO_2$ content of from 15 to 30 wt. %.

The solids content of component (C) and also that of component (D) in the respective emulsion or dispersion is preferably from 5 to 70 wt. % (especially from 10 to 50 wt. %).

The additives (E) may be any additives known in the manufacture of paints and dyes, such as, for example, inorganic and/or organic pigments, paint additives, such as dispersants, flow agents, thickeners, antifoaming agents and other auxiliary substances, adhesive agents, fungicides, bactericides, stabilisers, inhibitors, and catalysts. Component (V) may also be a mixture of several additives.

The preparation of the aqueous emulsions (I) and (II) of the polyfunctional carbosilanes and/or carbosiloxanes (A) and of the organopolysiloxanes (B) is carried out in a unit suitable for the introduction of high energy, preferably in a homogenizer or a jet dispersing device. The process of emulsification is known to the person skilled in the art and is described, for example, in Römpp "Chemie-Lexikon", eds. J. Falbe and M. Regitz, G. Thieme Verlag, Stuttgart, New York, Vol. 2, p. 1158 ff. The amount of active ingredient contained in the emulsions (I) and (II) is in each case preferably from 5 to 70 wt. % (especially from 30 to 50 wt. %). There may be used as emulsifiers any emulsifiers that are suitable for the preparation of stable silicone-containing aqueous emulsions, for example anionic, cationic, and non-ionic emulsifiers.

Examples of anionic low molecular weight, oligomeric, or polymeric emulsifiers or surfactants are alkali or alkaline-earth metal salts of fatty acids, for example, sodium salts of saturated fatty acids having from 10 to 21 carbon atoms, sodium salts of unsaturated fatty acids having from 12 to 18 carbon atoms, alkyl ether sulfonates such as ethers of α-sulfo-ω-hydroxypolyethylene glycols with, for example, 1-ethylphenylethylphenol, nonylphenol or alkyl ethers having from 12 to 18 carbon atoms, arylalkylsulfonates such as, for example, naphthalenesulfonic acids having straight-chained or branched butyl groups, or alkyl sulfates such as the sodium salts of long-chained sulfuric acid alkyl esters.

Examples of cationic low molecular weight, oligomeric, or polymeric emulsifiers or surfactants are the salts of amines bearing long-chain alkane groups having 8 to 22 carbon atoms in which the amines have been converted to the ammonium compounds with acids or by alkylation, as well as similar phosphorus compounds and sulfur compounds.

Examples of non-ionic oligomeric or polymeric emulsifiers or surfactants are alkyl polyglycol ethers or esters, such as ethoxylated long-chained alcohols carrying saturated or unsaturated bonds, for example, having from 12 to 18 carbon atoms, ethoxylated castor oil, ethoxylated (coconut) fatty acids, ethoxylated soybean oil, ethoxylated resin or rosin acids, ethoxylated and optionally propoxylated butyl diglycol, ethoxylated alkyl aryl ethers such as ethoxylated straight-chained and/or branched nonylphenol or octylphenol or benzylated p-hydroxybiphenyl, ethoxylated tri- and di-glycerides, and alkyl polyglycosides.

Also suitable as emulsifiers are ethoxylated long-chained alkyl- or alkenyl-amines, lecithin, reaction products of polyethylene glycols and diisocyanates modified by long-chained alkyl isocyanates, reaction products of castor oil and diethanolamine, or ethoxylated reaction products of sorbitan and long-chained alkane- or alkene-carboxylic acids.

The amount of emulsifiers contained in the emulsions (I) and (II) is from 0.1 to 30 wt. % (preferably from 0.5 to 10 wt. %). The emulsions (I) and (II) may also comprise up to 20 wt. % additives and auxiliary substances customary for aqueous emulsions. Examples of customary additives and auxiliary substances are protective colloids, anti-aging agents, bactericides, fungicides, lubricants, flow auxiliaries, wetting agents and dispersion auxiliaries, antioxidants, pH stabilizing agents such as amines, for example ethanolamine, diethanolamine, triethanolamine, dibutylamine, ammonium acetate, sodium and potassium acetate, solvents, for example, alcohols such as methanol, ethanol, n-propanol, isopropanol and butanol, ketones such as acetone and butanone, esters such as butyl acetate and methoxypropyl acetate, aromatic solvents such as toluene and xylene, and aliphatic solvents such as hexane, white spirit, and the like.

In a preferred embodiment of the invention, the aqueous preparation has the following composition:
(I) from 1 to 100 parts by weight (preferably from 5 to 60 parts by weight, especially from 5 to 30 parts by weight) of an aqueous emulsion of a polyfunctional carbosilane and/or carbosiloxane (A),
(II) from 0 to 70 parts by weight (preferably from 5 to 60 parts by weight) of an aqueous emulsion of at least one hydroxy- and/or alkoxy-functional organopolysiloxane (B),
(III) from 0 to 70 parts by weight (preferably from 20 to 60 parts by weight) of at least one organic polymer (C) dispersed or emulsified in water,
(IV) from 0 to 70 parts by weight (preferably from 10 to 30 parts by weight) of inorganic nanoparticles (D) dispersed or dispersible in water, and
(V) from 0 to 30 parts by weight of other additives (E), with the proviso that the sum of components (I) to (V) is 100 parts by weight.

The amount of active ingredient contained in the aqueous preparation is from 5 to 60 wt. % (preferably from 10 to 50 wt. %, especially from 20 to 40 wt. %).

The present invention also provides a process for the manufacture of the preparations according to the invention, wherein the individual components (I) to (V) are stirred together. The individual components may be mixed together in any desired sequence and stirred together according to known processes until a homogeneous mixture has formed. Likewise, it is possible, for example, first to prepare mixtures of (I) and (II), with which there are then mixed, separately or together, prepared aqueous mixtures of components (III) to (V). In a preferred embodiment of the invention, individual emulsions and/or dispersions of components (I) to (IV) which have been prepared separately and, optionally, other additives (E) are stirred together.

If the aqueous preparation contains inorganic or organic auxiliary substances as component (E), the methods used in the manufacture of paints, such as ball mills and other intensive mixing processes, are preferred for the manufacture of the preparation according to the invention.

The aqueous preparation according to the invention may be formulated either as a single-component system and as a multi-component system. For example, all the components (I) to (V) may be added together in accordance with the process according to the invention. It is, however, also possible to mix one or more of components (II) to (V) with the aqueous preparation shortly before application. The preparation is sufficiently stable to storage and may be diluted with water to the desired processing concentration for the corresponding application.

The invention additionally provides a method of treating mineral building materials with the preparation according to the invention, wherein the preparation is applied to the material to be coated, preferably by means of a spraying, dipping, rolling and painting technique, and is then dried at temperatures less than 150° C. (preferably at room temperature).

The preparation according to the invention may also be applied during the manufacture of the substrate to be used, for example during the manufacture of precast concrete parts. Depending upon their nature and the intended application, the materials to be treated may be used in the pretreated or unpretreated state. Any pretreatment may be carried out by any known method, such as, for example, jet treatment.

The invention relates also to the use of the aqueous preparation according to the invention as a waterproofing and/or impregnating agent or for providing mineral building materials with an easy to clean and/or antigraffiti finish.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight.

EXAMPLES

Preparation of the Starting Components

In all the Examples, the particle size was determined by means of light-scattering measurement.

1a) Preparation of an Emulsion of a Polyfunctional Carbosiloxane of Formula (I)

242.4 g of deionized water were placed in a two-liter stirrer reactor having an anchor agitator and heated to 50° C. A mixture of 34.33 g of polyoxyethylene triglyceride (Atlas G-1300 emulsifier from ICI) and 15.67 g of ethoxylated tridecyl alcohol (Renex 36 emulsifier from ICI) heated to 80° C. was added to the reactor and stirring was carried out for 15 minutes at a stirrer speed of 1000 rpm. The mixture was cooled to 23° C. and 2.0 g of fungicide (Preventol D2 from Bayer AG, Germany) were added. 1000.0 g of a solution of 75 wt. % of a siloxane mixture comprising approximately 50 wt. % of the compound of formula (4) and 50 wt. % of higher condensates and 25 wt. % of n-butanol was introduced dropwise into the mixture with stirring and stirring was continued for 30 minutes. 705.6 g of water were then added dropwise and stirring was carried out for a further 30 minutes. The resulting emulsion was emulsified using a jet dispersing device at a total pressure of 200 bar in one pass. A finely divided emulsion which had a solids content of 40.1% and an average particle size of 0.37 μm and which was stable for more than 6 months was obtained.

1b) Preparation of Another Emulsion of a Polyfunctional Carbosiloxane of Formula (I)

90.9 g of deionized water were placed in a one-liter stirrer reactor having an anchor agitator and heated to 50° C. A mixture of 17.16 g of polyoxyethylene triglyceride (Atlas G-1300 emulsifier from ICI) and 7.84 g of ethoxylated tridecyl alcohol (Renex 36 emulsifier from ICI) heated to 80° C. was added to the reactor and stirring was carried out for 15 minutes at a stirrer speed of 1000 rpm. The mixture was cooled to 23° C., and 1.0 g of fungicide (Preventol D2 from Bayer AG, Germany) and 5.0 g of diethanolamine were added. 500.0 g of a siloxane mixture of the compound of formula (5) in admixture with higher condensates of the compound of formula (5) was introduced dropwise into the mixture with stirring and stirring was continued for 30 minutes. A further 378.1 g of water were added dropwise and stirring was carried out for a further 30 minutes. The resulting emulsion was then emulsified using a jet dispersing device at a total pressure of 500 bar in one pass. A finely divided emulsion which had a solids content of 53.1% and an average particle size of 0.50 μm and which was stable for more than 6 months was obtained.

Example 1

Manufacture of a Preparation According to the Invention

To 9.13 g of an emulsion of a multifunctional carbosiloxane prepared according to 1a) in a glass beaker were added in succession, while stirring at a temperature of 21° C., 38.2 g of an aqueous emulsion of a methoxy-functional organopolysiloxane (B) having an active ingredient content of 35 wt. %, 31.8 g of an aqueous emulsion of a polyacrylate resin (C) containing hydroxyl groups and having an active ingredient content of 42 wt. % and an OH number of 4% based on the resin (obtainable as Bayhydrol® VPLS 2054 from Bayer AG), 21.2 g of an aqueous silica sol dispersion (D) having an SiO$_2$ content of 30 wt.% and a particle size of from 7 to 8 nm (obtainable as Levasil® 300/30% from Bayer AG), and 1.5 g of an aqueous catalyst emulsion (E). The reaction mixture was then stirred for 30 minutes. A homogeneous aqueous preparation having an active ingredient content of 36 wt. % was formed.

Example 2

Manufacture of a Preparation According to the Invention

To 7.3 g of an emulsion of a multifunctional carbosiloxane prepared according to 1b) in a glass beaker were added in succession, while stirring at a temperature of 21° C., 38.2 g of an aqueous emulsion of a methoxy-functional organopolysiloxane having an active ingredient content of 35 wt. % (B), 31.8 g of an aqueous emulsion of a poly-acrylate resin containing hydroxyl groups and having an active ingredient content of 42 wt. % and an OH number of 4% based on the resin (obtainable as Bayhydrol® VPLS 2054 from Bayer AG) (C), 21.2 g of an aqueous silica sol dispersion having an SiO$_2$ content of 30 wt. % and a particle size of from 7 to 8 nm (obtainable as Levasil® 300/30% from Bayer AG) (D), and 1.5 g of an aqueous catalyst emulsion (E). The reaction mixture was then stirred for 30 minutes. A homogeneous aqueous preparation having an active ingredient content of 37 wt. % was formed.

APPLICATION EXAMPLES

In order to test the waterproofing and impregnating properties and the easy to clean properties, the aqueous preparations according to the invention of Examples 1 and 2 were applied using a brush to 5×7 cm concrete test pieces (cement mortar according to DIN 196-1 plus cement PZ 35 plus water after storage for 28 days) and 5×7 cm test pieces of sand-lime brick. The test pieces were then stored for 7 days at 20° C. The waterproofing/impregnating action was tested by passing water over the substrate standing at an angle of 45° for five minutes. The degree of wetting was evaluated visually. Commercially available green spray paint and Staedler permanent marker in the colors red and black were each applied as graffiti to a test piece. After storage for 12 hours, a test was carried out to determine whether the permanent marker could be removed by wiping five times with a cotton cloth soaked in isopropanol. For the green spray paint, a test was carried out to see whether the graffiti could be removed with Prochemko Antigraffiti and with Henkel P3 scribex. To that end, Prochemko Antigraffiti was applied to the sprayed substrate, allowed to act for 10 minutes, and then wiped off. For Henkel P3, the substrate was rubbed five times with a cotton cloth. The same method of treatment was applied for the comparison examples.

In evaluating the easy-to-clean/antigraffiti properties, the following parameters are considered:

1. The visual appearance of the substrate after treatment with the preparations according to the invention and the reference samples:

Q: visual appearance of the substrate unchanged

R: visual appearance of the substrate changed slightly (shiny or darker in color than before treatment)

S: visual appearance of the substrate markedly changed (shiny or darker in color than before treatment)

2. Impregnating/waterproofing action:

q: all the water rolls off the surface of the substrate r: most of the water rolls off, substrate wetted slightly s: substrate completely wetted by water 3. Easy-to-clean/antigraffiti properties:

X: spray paint and Staedler permanent marker removed completely

Y: spray paint removed, shades of Staedler permanent marker still remain

Z: spray paint and Staedler permanent marker still visible

Example 3

Treatment with a Preparation According to the Invention

A test piece of concrete and a test piece of sand-lime brick were each treated in the manner described for the aqueous preparation according to the invention of Example 1. The parameters mentioned above were then tested.

Example 4

Treatment with a Preparation According to the Invention

A test piece of concrete and a test piece of sand-lime brick were each treated in the manner described for the aqueous preparation according to the invention of Example 2. The parameters mentioned above were then tested.

Example 5 (comparison)

Treatment with a Silane/Siloxane-based Aqueous Impregnating Emulsion

A test piece of concrete and a test piece of sand-lime brick were each treated with a commercial silane/siloxane-based aqueous impregnating emulsion having an active ingredient content of 60%. Prior to application, the aqueous impregnating emulsion was diluted with water in a ratio of 1:9 in accordance with the instructions for use. The test pieces were immersed in the dilute impregnating emulsion for 30 seconds and then stored for 7 days at 20° C. The mentioned parameters were tested.

Example 6 (comparison)

Solvent-based Preparation Based on Multifunctional Carbosilanes

In a glass beaker, 29.5 g of n-butanol and 2.7 g of 0.1N para-toluenesulfonic acid were added in succession with stirring at a temperature of 19° C. to 68 g of a 30% ethanolic solution of a reaction product of 2.6 parts by weight of gamma-aminopropyltriethoxysilane with one part by weight of an aliphatic polyisocyanate having an NCO content of 21.5 wt. %. The reaction mixture was stirred at 19° C. for 60 minutes.

A test piece of concrete and a test piece of sand-lime brick were each treated in the manner described above with the solvent-containing preparation. The parameters mentioned above were then tested.

Test Results

| Example | Visual appearance of The substrate | | Impregnating/ waterproofing action | | Easy-to-clean/ antigraffiti properties | |
|---|---|---|---|---|---|---|
| | Concrete | Sand-lime brick | Concrete | Sand-lime brick | Concrete | Sand-lime brick |
| Example 3 | Q | Q | q | q | X | X |
| Example 4 | Q | Q | q | q | X | X |
| Comparison Example 5 | Q | Q | q | q | Z | Z |
| Comparison Example 6 | R | S | r | r | Z | Y |

The aqueous preparations according to the invention achieved all the objects of the invention. The visual appearance of the mineral building material was not changed, the building material was sufficiently waterproofed or impregnated after treatment with the aqueous preparations according to the invention, and graffiti could easily be completely removed from the treated materials.

Commercial silane/siloxane-based aqueous impregnating emulsions (Comparison Example 5) likewise did not change the appearance of mineral building materials and they waterproofed or impregnated them to a sufficient degree. However, it was not possible to protect mineral building materials from graffiti by treating them with silane/siloxane-based aqueous impregnating emulsions.

Solvent-containing sol/gel systems of multifunctional carbosilanes did not achieve any of the objects satisfactorily.

What is claimed is:

1. An aqueous preparation comprising (I) an emulsion of a polyfunctional carbosilane and/or carbosiloxane (A), that contains at least two units of the formula (1)

$$-(CH_2)_m SiR^1_n X_{3-n} \quad (1)$$

wherein
   m is from 1 to 6,
   n is from 0 to 2,
   $R^1$ is an unsubstituted $C_1$–$C_{18}$ hydrocarbon or a hydrocarbon that contains at least one of O, N, S, or P, each $R^1$ within the molecule being identical or different, and
   X is a radical selected from the group consisting of OH, $C_1$–$C_4$ alkoxy, $C_6$–$C_{20}$ aryloxy, $C_1$–$C_6$ acyloxy, and hydrogen, (II) an emulsion of at least one organo(poly)siloxane (B),
   (III) at least one organic polymer (C) dispersed or emulsified in water,
   (IV) inorganic nanoparticles (D) dispersed or dispersible in water, and
   (V) optional other additives (E).

2. An aqueous preparation according to claim 1 wherein the polyfunctional carbosilane and/or carbosiloxane (A) is a silane of the formula (2)

$$R^2_{4-p}Si[-O_t(CH_2)_m SiR^1_n X_{3-n}]_p \quad (2)$$

or the partial condensation products thereof, wherein
   t is 0 or 1,
   p is 4, 3, or 2,
   m is from 1 to 6,
   n is from 0 to 2,
   $R^1$ is an unsubstituted $C_1$–$C_{18}$ hydrocarbon or a hydrocarbon that contains at least O, N, S, or P, each $R^1$ within the molecule being identical or different,
   $R^2$ is $C_1$–$C_{18}$ alkyl and/or $C_6$–$C_{20}$ aryl, and
   X is a radical selected from the group consisting of OH, $C_1$–$C_4$ alkoxy, $C_6$–$C_{20}$ aryloxy, $C_1$–$C_6$ acyloxy, and hydrogen.

3. An aqueous preparation according to claim 1 wherein the polyfunctional carbosilane (A) is a siloxane and/or the partial condensation product thereof having at least two structural units selected from monofunctional units $R^3_3SiO_{1/2}$, difunctional units $R^4_2SiO_{2/2}$, and trifunctional units $R^5SiO_{3/2}$ and optionally, in addition, tetrafunctional units $SiO_{4/2}$, wherein $R^3$, $R^4$ and $R^5$, each independently of the others, represent H, $C_1$–$C_{18}$ alkyl, $C_2$–$C_{18}$ alkenyl or $C_6$–$C_{20}$ aryl, or units of formula (1).

4. An aqueous preparation according to claim 3 wherein the polyfunctional carbosilane (A) is a siloxane having a number average molecular weight of from 308 to 5000.

5. An aqueous preparation according to claim 1 wherein the polyfunctional carbosilane (A) is a compound of formula (3)

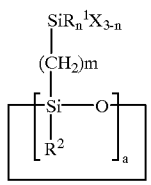

(3)

or the partial condensation product thereof, wherein m is from 1 to 6, n is from 0 to 2, a is from 3 to 6, $R^1$ is an unsubstituted $C_1$–$C_{18}$-hydrocarbon or a hydrocarbon that contains at least O, N, S or P, each $R^1$ within the molecule being identical or different, $R^2$ is $C_1$–$C_{18}$-alkyl and/or $C_6$–$C_{20}$-aryl, and X is OH, $C_1$–$C_4$ alkoxy, $C_6$–$C_{20}$ aryloxy, $C_1$–$C_6$ acyloxy, or hydrogen.

6. An aqueous preparation according to claim 1 wherein the polyfunctional carbosilane (A) is a compound of formula (4)

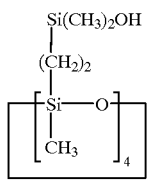

(4)

or a partial condensation product thereof.

7. An aqueous preparation according to claim 1 wherein the siloxane is a compound of formula (5)

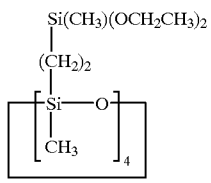

(5)

or a partial condensation product thereof.

8. An aqueous preparation according to claim 1 wherein component (B) is an aqueous emulsion of at least one hydroxy- and/or alkoxy-functional organopolysiloxane containing from 0 to 50 wt. % monofunctional units $R^6_3SiO_{1/2}$, from 0 to 60 wt. % difunctional units $R^7_2SiO_{2/2}$, from 0 to 100 wt. % trifunctional units $R^8SiO_{3/2}$ and from 0 to 60 wt. % tetrafunctional units $SiO_{4/2}$, the sum of all units being 100 wt. %, wherein $R^6$, $R^7$, and $R^8$ independently of one another represent unsubstituted $C_1$–$C_{18}$-hydrocarbon groups or hydrocarbon groups containing at least O, N, S, or P.

9. An aqueous preparation according to claim 1 wherein component (C) is an aqueous acrylate dispersion that is hydroxy-functional and/or contains alkoxysilyl groups.

10. An aqueous preparation according to claim 1 wherein component (C) is a water-dispersible or water-emulsifiable polymer having urea or urethane groups and having hydroxy and/or alkoxysilyl groups.

11. An aqueous preparation according to claim 1 wherein the inorganic nanopartides (D) are metal or semimetal oxides and/or oxide hydrates having a particle diameter of from 5 to 100 nm.

12. An aqueous preparation according to claim 1 wherein the inorganic nanoparticles (D) are an aqueous dispersion of silicon dioxide having an average particle size of from 5 to 100 nm.

13. An aqueous preparation according to claim 1 comprising (I) from 5 to 70 parts by weight of an aqueous emulsion of a polyfunctional carbosilane and/or carbosiloxane (A), (II) from 5 to 70 parts by weight of an aqueous emulsion of at least one hydroxy- and/or alkoxy-functional organopolysiloxane (B), (III) from 5 to 70 parts by weight of at least one organic polymer (C) dispersed or emulsified in water, (IV) from 5 to 70 parts by weight of inorganic nanoparticles (D) dispersed or dispersible in water, and (V) from 0 to 30 parts by weight of other additives (E), with the proviso that the sum of components (I) to (V) is 100 parts by weight.

14. A process for the manufacture of the aqueous preparation according to claim 1 comprising stirring together (I) an emulsion of a polyfunctional carbosilane and/or carbosiloxane (A), (II) an emulsion of at least one organo(poly)siloxane (B), (III) at least one organic polymer (C) dispersed or emulsified in water, (IV) inorganic nanoparticles (D) dispersed or dispersible in water, and (V) optional other additives (E).

15. A method for waterproofing or impregnating a mineral building material comprising applying an aqueous preparation according to claim 1 to the mineral building material.

16. A method for providing a mineral building material with an easy-to-clean and/or antigraffiti finish comprising applying an aqueous preparation according to claim 1 to the mineral building material.

17. A method of treating a solid mineral building material comprising applying an aqueous preparation according to claim 1 to the solid mineral building material and drying the material at a temperature less than 150° C.

* * * * *